(12) United States Patent
Zhang et al.

(10) Patent No.: US 12,494,259 B2
(45) Date of Patent: Dec. 9, 2025

(54) ERASE OPERATIONS IN MEMORY DEVICES

(71) Applicant: Yangtze Memory Technologies Co., Ltd., Hubei (CN)

(72) Inventors: Jinlong Zhang, Wuhan (CN); Jianyu Xiang, Wuhan (CN); Jing Wei, Wuhan (CN); Lei Guan, Wuhan (CN); Junyao Zhu, Wuhan (CN); Yuankang Yang, Wuhan (CN); Qingqi Li, Wuhan (CN); Xueqing Huang, Wuhan (CN)

(73) Assignee: Yangtze Memory Technologies Co., Ltd., Hubei (CN)

( * ) Notice: Subject to any disclaimer, the term of this patent is extended or adjusted under 35 U.S.C. 154(b) by 120 days.

(21) Appl. No.: 18/443,010

(22) Filed: Feb. 15, 2024

(65) Prior Publication Data

US 2025/0239313 A1    Jul. 24, 2025

Related U.S. Application Data

(63) Continuation of application No. PCT/CN2024/073022, filed on Jan. 18, 2024.

(51) Int. Cl.
  *G11C 16/34*    (2006.01)
  *G11C 16/16*    (2006.01)
  *G11C 16/26*    (2006.01)
(52) U.S. Cl.
  CPC .......... *G11C 16/3445* (2013.01); *G11C 16/16* (2013.01); *G11C 16/26* (2013.01); *G11C 16/3472* (2013.01)

(58) Field of Classification Search
  CPC .................................................. G11C 16/3472
  See application file for complete search history.

(56) References Cited

U.S. PATENT DOCUMENTS

2016/0343449 A1   11/2016   Lee et al.
2021/0082531 A1*   3/2021   Shinohara ........... G06F 9/30189
2021/0225452 A1    7/2021   Yoon et al.

OTHER PUBLICATIONS

International Search Report in International Appln. No. PCT/CN2024/073022, mailed on Jun. 21, 2024, 3 pages (with English translation).

* cited by examiner

*Primary Examiner* — Jason Lappas
(74) *Attorney, Agent, or Firm* — Fish & Richardson P.C.

(57) ABSTRACT

Example memory devices, systems, and methods for reducing erase disturb in memory devices are disclosed. One example method includes erasing, during an erase operation of a block in a memory cell array, one or more memory cells in the block. It is verified, during the erase operation of the block, whether the one or more memory cells are erased. Each of one or more blocks in the memory cell array is respectively read during the erase operation of the block, where respectively reading each of the one or more blocks includes applying a first voltage to a first select gate line coupled to a first select gate transistor in the block, and applying a second voltage to a second select gate line coupled to a second select gate transistor in one of the one or more blocks, where the first voltage is lower than the second voltage.

20 Claims, 8 Drawing Sheets

ERASE OPERATIONS IN MEMORY DEVICES

CROSS-REFERENCE TO RELATED APPLICATIONS

This application is a continuation of International Application No. PCT/CN2024/073022, filed on Jan. 18, 2024, the disclosure of which is hereby incorporated by reference in its entirety.

TECHNICAL FIELD

The present disclosure relates to memory devices, systems, and methods for erase operations in memory devices.

BACKGROUND

Flash memory is a low-cost, high-density, nonvolatile solid-state storage medium that can be electrically erased and reprogrammed. Flash memory includes NOR flash memory and NAND flash memory. Various operations can be performed by a flash memory, for example, program (write) and erase operations, to change the threshold voltage of each memory cell to a respective level. For NAND flash memory, an erase operation can be performed at the block level.

SUMMARY

The present disclosure relates to memory devices, systems, and methods for erase operations in memory devices.

Certain aspects of the subject matter described here can be implemented as a method. The method includes erasing, during an erase operation of a target block in a memory cell array, one or more memory cells in the target block. It is verified, during the erase operation of the target block, whether the one or more memory cells are erased. Each of one or more blocks in the memory cell array is respectively read during the erase operation of the target block, where respectively reading each of the one or more blocks includes applying a first voltage to a first select gate line coupled to a first select gate transistor in the target block, and applying a second voltage to a second select gate line coupled to a second select gate transistor in one of the one or more blocks, where the first voltage is lower than the second voltage.

The method can include one or more of the following features.

In some implementations, the one or more blocks include a first block adjacent to the target block and a second block adjacent to the target block, where the first block and the second block are on two opposite sides of the target block.

In some implementations, the one or more blocks include a third block adjacent to the first block and a fourth block adjacent to the second block.

In some implementations, respectively reading each of the one or more blocks includes reading the first block and the second block, including during a period of applying the first voltage to the first select gate line coupled to the first select gate transistor in the target block, applying the second voltage to a select gate line coupled to a select gate transistor in the first block, and applying the second voltage to a select gate line coupled to a select gate transistor in the second block.

In some implementations, respectively reading each of the one or more blocks in the memory cell array includes reading the first block, including applying a third voltage to a word line coupled to at least one memory cell in the first block, where the third voltage is higher than a voltage of a word line coupled to at least one memory cell in the second block, applying a fourth voltage to a select gate line coupled to at least one select gate transistor in the second block, and applying the second voltage to a select gate line coupled to at least one select gate transistor in the first block, where the second voltage is higher than the fourth voltage.

In some implementations, respectively reading each of the one or more blocks in the memory cell array further includes: after reading the first block, reading the second block, including applying the third voltage to the word line coupled to at least one memory cell in the second block, where the third voltage is higher than a voltage of the word line coupled to at least one memory cell in the first block, applying the fourth voltage to the select gate line coupled to at least one select gate transistor in the first block, and applying the second voltage to a select gate line coupled to at least one select gate transistor in the second block.

In some implementations, reading the first block further includes applying the fourth voltage to a select gate line coupled to at least one select gate transistor in the target block, where the fourth voltage is lower than the third voltage.

In some implementations, a range of the third voltage is 1.8V to 3.8V, and a range of the second voltage is 2.2V to 3.5V.

In some implementations, after erasing the one or more memory cells in the target block and before respectively reading each of the one or more blocks, applying a fifth voltage to a select gate line coupled to at least one select gate transistor in the memory cell array, and applying a sixth voltage to a word line coupled to at least one memory cell in the memory cell array, where the fifth voltage is lower than the sixth voltage.

In some implementations, respectively reading each of the one or more blocks includes: after erasing the one or more memory cells in the target block and during the erase operation of the target block, respectively reading each of the one or more blocks.

Certain aspects of the subject matter described here can be implemented as a memory device. The memory device includes a memory cell array and a peripheral circuit coupled to the memory cell array and configured to perform operations including erasing, during an erase operation of a target block in a memory cell array, one or more memory cells in the target block. It is verified, during the erase operation of the target block, whether the one or more memory cells are erased. Each of one or more blocks in the memory cell array is respectively read during the erase operation of the target block, where respectively reading each of the one or more blocks includes applying a first voltage to a first select gate line coupled to a first select gate transistor in the target block, and applying a second voltage to a second select gate line coupled to a second select gate transistor in one of the one or more blocks, where the first voltage is lower than the second voltage.

The memory device can include one or more of the following features.

In some implementations, the one or more blocks include a first block adjacent to the target block and a second block adjacent to the target block, where the first block and the second block are on two opposite sides of the target block.

In some implementations, the one or more blocks include a third block adjacent to the first block and a fourth block adjacent to the second block.

In some implementations, respectively reading each of the one or more blocks includes reading the first block and the second block, including during a period of applying the first voltage to the first select gate line coupled to the first select gate transistor in the target block, applying the second voltage to a select gate line coupled to a select gate transistor in the first block, and applying the second voltage to a select gate line coupled to a select gate transistor in the second block.

In some implementations, respectively reading each of the one or more blocks in the memory cell array includes reading the first block, including applying a third voltage to a word line coupled to at least one memory cell in the first block, where the third voltage is higher than a voltage of a word line coupled to at least one memory cell in the second block, applying a fourth voltage to a select gate line coupled to at least one select gate transistor in the second block, and applying the second voltage to a select gate line coupled to at least one select gate transistor in the first block, where the second voltage is higher than the fourth voltage.

In some implementations, respectively reading each of the one or more blocks in the memory cell array further includes: after reading the first block, reading the second block, including applying the third voltage to the word line coupled to at least one memory cell in the second block, where the third voltage is higher than a voltage of the word line coupled to at least one memory cell in the first block, applying the fourth voltage to the select gate line coupled to at least one select gate transistor in the first block, and applying the second voltage to a select gate line coupled to at least one select gate transistor in the second block.

In some implementations, reading the first block further includes applying the fourth voltage to a select gate line coupled to at least one select gate transistor in the target block, where the fourth voltage is lower than the third voltage.

In some implementations, a range of the third voltage is 1.8V to 3.8V, and a range of the second voltage is 2.2V to 3.5V.

In some implementations, after erasing the one or more memory cells in the target block and before respectively reading each of the one or more blocks, applying a fifth voltage to a select gate line coupled to at least one select gate transistor in the memory cell array, and applying a sixth voltage to a word line coupled to at least one memory cell in the memory cell array, where the fifth voltage is lower than the sixth voltage.

In some implementations, respectively reading each of the one or more blocks includes: after erasing the one or more memory cells in the target block and during the erase operation of the target block, respectively reading each of the one or more blocks.

Certain aspects of the subject matter described here can be implemented as a memory system. The memory system includes a memory device and a controller coupled to the memory device and configured to initiate operations. The memory device includes a memory cell array and a peripheral circuit coupled to the memory cell array and configured to perform the operations including erasing, during an erase operation of a target block in a memory cell array, one or more memory cells in the target block. It is verified, during the erase operation of the target block, whether the one or more memory cells are erased. Each of one or more blocks in the memory cell array is respectively read during the erase operation of the target block, where respectively reading each of the one or more blocks includes applying a first voltage to a first select gate line coupled to a first select gate transistor in the target block, and applying a second voltage to a second select gate line coupled to a second select gate transistor in one of the one or more blocks, where the first voltage is lower than the second voltage.

The memory system can include one or more of the following features.

In some implementations, the one or more blocks include a first block adjacent to the target block and a second block adjacent to the target block, where the first block and the second block are on two opposite sides of the target block.

In some implementations, the one or more blocks include a third block adjacent to the first block and a fourth block adjacent to the second block.

In some implementations, respectively reading each of the one or more blocks includes reading the first block and the second block, including during a period of applying the first voltage to the first select gate line coupled to the first select gate transistor in the target block, applying the second voltage to a select gate line coupled to a select gate transistor in the first block, and applying the second voltage to a select gate line coupled to a select gate transistor in the second block.

In some implementations, respectively reading each of the one or more blocks in the memory cell array includes reading the first block, including applying a third voltage to a word line coupled to at least one memory cell in the first block, where the third voltage is higher than a voltage of a word line coupled to at least one memory cell in the second block, applying a fourth voltage to a select gate line coupled to at least one select gate transistor in the second block, and applying the second voltage to a select gate line coupled to at least one select gate transistor in the first block, where the second voltage is higher than the fourth voltage.

In some implementations, respectively reading each of the one or more blocks in the memory cell array further includes: after reading the first block, reading the second block, including applying the third voltage to the word line coupled to at least one memory cell in the second block, where the third voltage is higher than a voltage of the word line coupled to at least one memory cell in the first block, applying the fourth voltage to the select gate line coupled to at least one select gate transistor in the first block, and applying the second voltage to a select gate line coupled to at least one select gate transistor in the second block.

In some implementations, reading the first block further includes applying the fourth voltage to a select gate line coupled to at least one select gate transistor in the target block, where the fourth voltage is lower than the third voltage.

In some implementations, a range of the third voltage is 1.8V to 3.8V, and a range of the second voltage is 2.2V to 3.5V.

In some implementations, after erasing the one or more memory cells in the target block and before respectively reading each of the one or more blocks, applying a fifth voltage to a select gate line coupled to at least one select gate transistor in the memory cell array, and applying a sixth voltage to a word line coupled to at least one memory cell in the memory cell array, where the fifth voltage is lower than the sixth voltage.

In some implementations, respectively reading each of the one or more blocks includes: after erasing the one or more memory cells in the target block and during the erase operation of the target block, respectively reading each of the one or more blocks.

The details of these and other aspects and implementations of the present disclosure are set forth in the accompanying drawings and the description below. Other features, objects, and advantages of the disclosure will be apparent from the description and drawings, and from the claims.

BRIEF DESCRIPTION OF DRAWINGS

Like reference numbers and designations in the various drawings indicate like elements.

DETAILED DESCRIPTION

This specification relates to memory devices, systems, and methods for reducing erase disturb in memory devices. In some cases, when a memory cell block in a memory cell array is erased, the channel hole potential of the memory cell block cannot be fully discharged. Then during subsequent erase cycles of the memory cell block, the channel hole potential of the memory cell block will continue to accumulate. Due to the coupling effect between adjacent memory cell blocks, neighboring blocks of the memory cell block that is erased will have increased channel hole potentials, which can lead to increased voltage differences between the channels and the word lines in the neighboring blocks. These increased voltage differences can cause soft erase of the neighboring blocks. To reduce the erase disturb described above, additional read operations can be performed on the neighboring blocks of a memory cell block after the memory cell block is erased and the erase is verified. These additional read operations can turn on the select gate lines of the neighboring blocks, and consequently discharge the channel hole potentials in the neighboring blocks, and reduce the erase disturb in the neighboring blocks.

Implementations of the present disclosure can provide one or more of the following technical effects. For example, channel hole potentials in neighboring blocks of a block that has been erased can be reduced. As such, the erase disturb in the neighboring blocks due to block-to-block coupling effect can be reduced, and soft erase in neighboring blocks can be mitigated. Moreover, the time used to perform the additional read operations on neighboring blocks can have low impact on the performance of the memory device, while the reliability of the memory device can be significantly improved.

Figure 1:
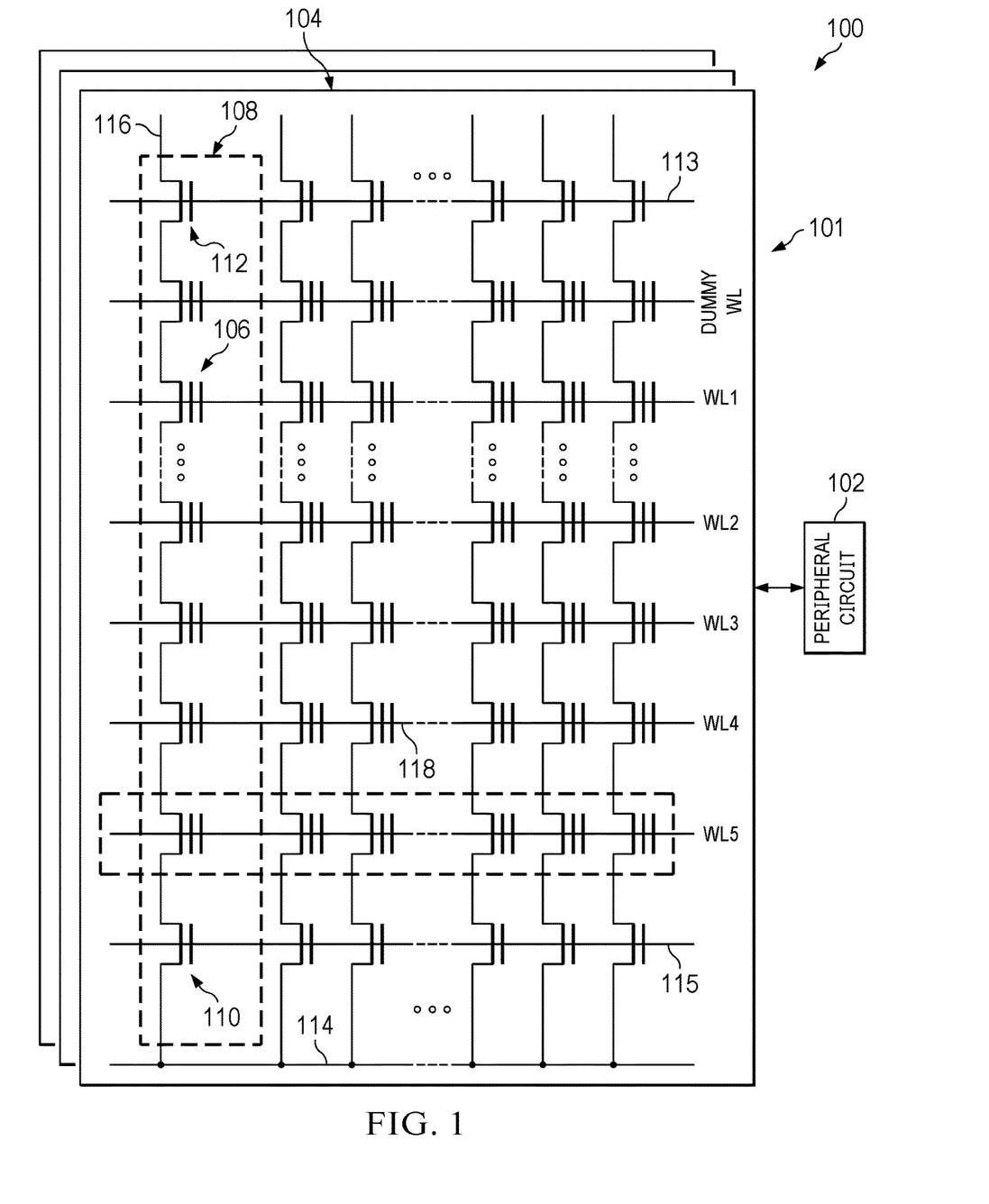
FIG. 1 illustrates an example of a schematic circuit diagram of a memory device including peripheral circuits, according to some aspects of the present disclosure.

FIG. 1 illustrates an example of a schematic circuit diagram of a memory device 100 including peripheral circuits, according to some aspects of the present disclosure. Memory device 100 can include a memory cell array 101 and peripheral circuits 102 coupled to memory cell array 101. Memory cell array 101 can be a NAND Flash memory cell array in which memory cells 106 are provided in the form of an array of NAND memory strings 108 each extending vertically above a substrate (not shown). In some implementations, each NAND memory string 108 includes a plurality of memory cells 106 coupled in series and stacked vertically. Each memory cell 106 can hold a continuous, analog value, such as an electrical voltage or charge that depends on the number of electrons trapped within a region of memory cell 106. Each memory cell 106 can be either a floating gate type of memory cell including a floating-gate transistor or a charge trap type of memory cell including a charge-trap transistor.

In some implementations, each memory cell 106 is a single-level cell (SLC) that has two possible memory states and thus, can store one bit of data. For example, the first memory state "0" can correspond to a first range of voltages, and the second memory state "1" can correspond to a second range of voltages. In some implementations, each memory cell 106 is a multi-level cell (MLC) that is capable of storing more than a single bit of data in more than four memory states. For example, the MLC can store two bits per cell, three bits per cell (also known as triple-level cell (TLC)), or four bits per cell (also known as a quad-level cell (QLC)). Each MLC can be programmed to assume a range of possible nominal storage values. In one example, if each MLC stores two bits of data, then the MLC can be programmed to assume one of three possible programming levels from an erased state by writing one of three possible nominal storage values to the cell. A fourth nominal storage value can be used for the erased state.

As shown in FIG. 1 each NAND memory string 108 can include a source select gate (SSG) 110 at its source end and a drain select gate (DSG) 112 at its drain end. SSG 110 and DSG 112 can be configured to activate selected NAND memory strings 108 (columns of the array) during read and program operations. In some implementations, the sources of NAND memory strings 108 in the same block 104 are coupled through a same source line (SL) 114, e.g., a common SL. In other words, all NAND memory strings 108 in the same block 104 have an array common source (ACS), according to some implementations. DSG 112 of each NAND memory string 108 is coupled to a respective bit line 116 from which data can be read or written via an output bus (not shown), according to some implementations. In some implementations, each NAND memory string 108 is configured to be selected or deselected by applying a select voltage or a deselect voltage (e.g., 0 V) to respective DSG 112 through one or more DSG lines 113, and/or by applying a select voltage or a deselect voltage (e.g., 0 V) to respective SSG 110 through one or more SSG lines 115.

As shown in FIG. 1, NAND memory strings 108 can be organized into multiple blocks 104, each of which can have a common source line 114, e.g., coupled to the ACS. In some implementations, each block 104 is the basic data unit for erase operations, i.e., all memory cells 106 on the same block 104 are erased at the same time. To erase memory cells 106 in a selected block 104, source lines 114 coupled to selected block 104 as well as unselected blocks 104 in the same plane as selected block 104 can be biased with an erase voltage (Vers), such as a high positive voltage (e.g., 20 V or more). In some examples, erase operation may be performed at a half-block level, a quarter-block level, or a level having any suitable number of blocks or any suitable fractions of a block. Memory cells 106 of adjacent NAND memory strings can be coupled through word lines 118 that select which row of memory cells 106 is affected by read and program operations. Each word line 118 can include a plurality of control gates (gate electrodes) at each memory cell 106 and a gate line coupling the control gates. Example word lines (WLs) shown in FIG. 1 include dummy WL, WL1, WL2, WL3, WL4, and WL5 that are between one or more DSG lines 113 and one or more SSG lines 115.

Figure 2:
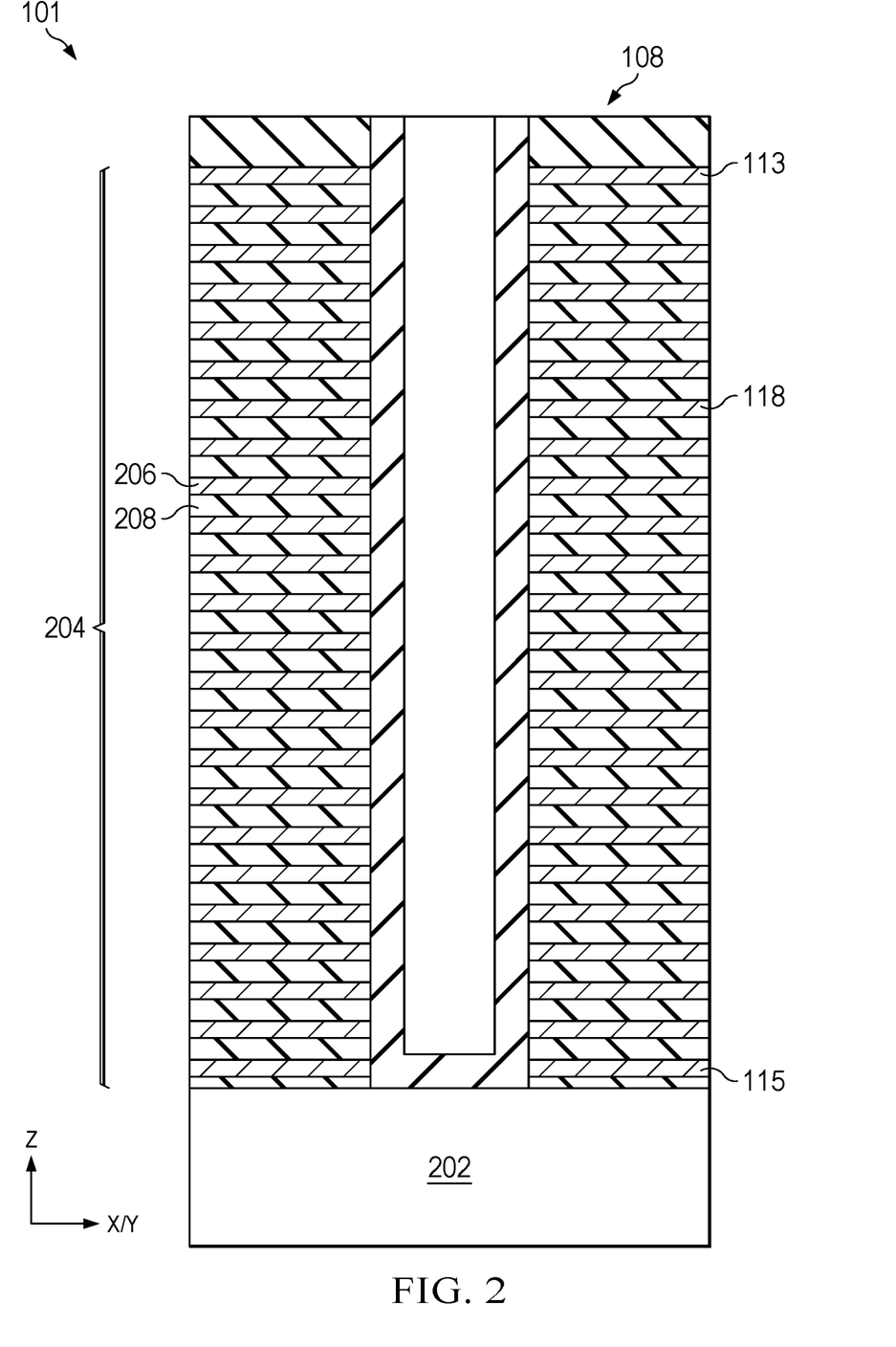
FIG. 2 illustrates an example of a side view of cross-sections of a memory cell array including NAND memory strings, according to some aspects of the present disclosure.

FIG. 2 illustrates an example of a side view of cross-sections of a memory cell array 101 including NAND memory strings 108, according to some aspects of the present disclosure. As shown in FIG. 2, NAND memory string 108 can extend vertically through a memory stack 204 above a substrate 202. Substrate 202 can include silicon (e.g., single crystalline silicon), silicon germanium (SiGe), gallium arsenide (GaAs), germanium (Ge), silicon on insulator (SOI), germanium on insulator (GOI), or any other suitable materials.

Memory stack 204 can include interleaved gate conductive layers 206 and gate-to-gate dielectric layers 208. The number of the pairs of gate conductive layers 206 and gate-to-gate dielectric layers 208 in memory stack 204 can determine the number of memory cells 106 in memory cell array 101. Gate conductive layer 206 can include conductive materials including, but not limited to, tungsten (W), cobalt (Co), copper (Cu), aluminum (Al), polysilicon, doped silicon, silicides, or any combination thereof. In some implementations, each gate conductive layer 206 includes a metal layer, such as a tungsten layer. In some implementations, each gate conductive layer 206 includes a doped polysilicon layer. Each gate conductive layer 206 can include control gates surrounding the memory cells 106, DSG 112, or SSG 110, and can extend laterally as DSG line 113 at the top of memory stack 204, SSG line 115 at the bottom of memory stack 204, or word line 118 between DSG line 113 and SSG line 115.

Figure 3:
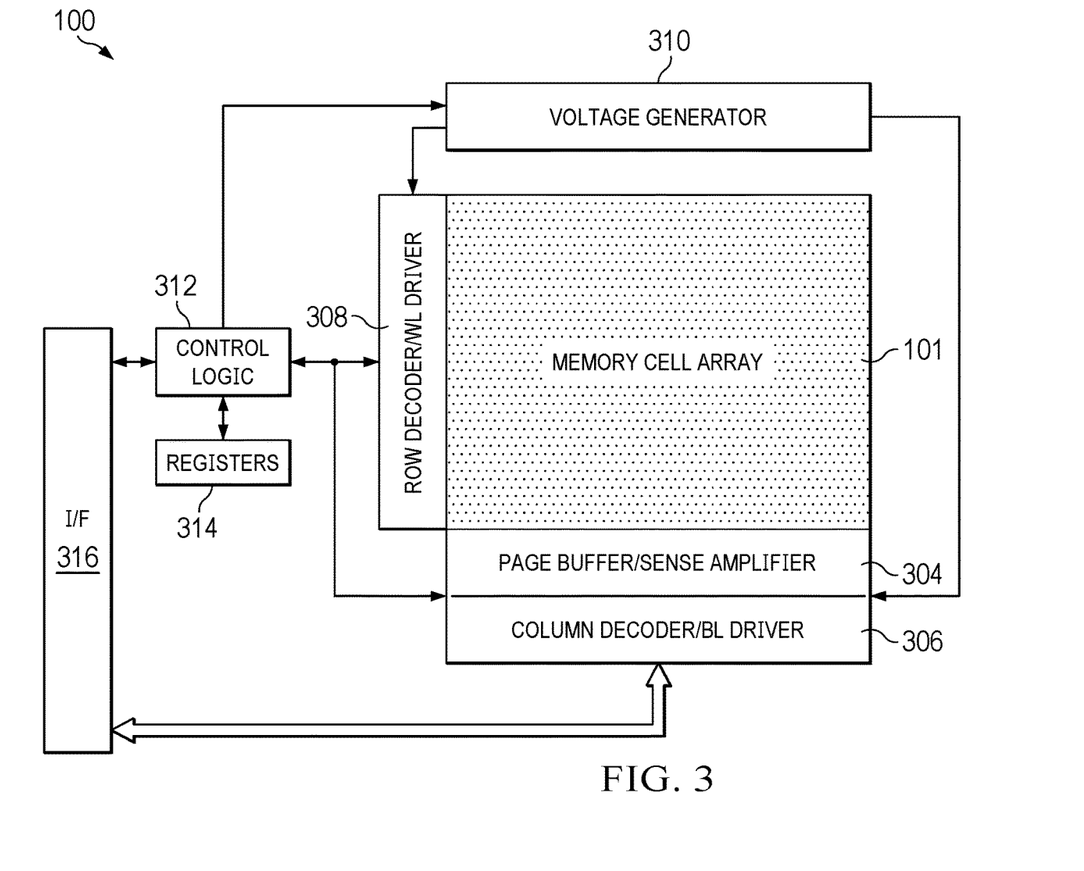
FIG. 3 illustrates an example of transactions between a host and a device, according to some aspects of the present disclosure.

Peripheral circuits 102 can be coupled to memory cell array 101 through bit lines 116, word lines 118, source lines 114, SSG lines 115, and DSG lines 113. Peripheral circuits 102 can include any suitable analog, digital, and mixed-signal circuits for facilitating the operations of memory cell array 101 by applying and sensing voltage signals and/or current signals to and from each target memory cell of the memory cells 106 through bit lines 116, word lines 118, source lines 114, SSG lines 115, and DSG lines 113. Peripheral circuits 102 can include various types of peripheral circuits formed using metal-oxide-semiconductor (MOS) technologies. For example, FIG. 3 illustrates some example peripheral circuits, according to some aspects of the present disclosure. The example peripheral circuits include a page buffer/sense amplifier 304, a column decoder/bit line driver 306, a row decoder/word line driver 308, a voltage generator 310, control logic 312, registers 314, an interface 316, and a data bus. In some examples, additional peripheral circuits not shown in FIG. 3 may be included as well.

Page buffer/sense amplifier 304 can be configured to read and program (write) data from and to memory cell array 101 according to the control signals from control logic 312. In one example, page buffer/sense amplifier 304 may store one page of program data (write data) to be programmed into one page of memory cell array 101. In another example, page buffer/sense amplifier 304 may perform program verify operations to ensure that the data has been properly programmed into memory cells 106 coupled to selected word lines 118. In still another example, page buffer/sense amplifier 304 may also sense the low power signals from bit line 116 that represents a data bit stored in memory cell 106 and amplify the small voltage swing to recognizable logic levels in a read operation. Column decoder/bit line driver 306 can be configured to be controlled by control logic 312 and select one or more NAND memory strings 108 by applying bit line voltages generated from voltage generator 310.

Row decoder/word line driver 308 can be configured to be controlled by control logic 312 and select/deselect blocks 104 of memory cell array 101 and select/deselect word lines 118 of block 104. Row decoder/word line driver 308 can be further configured to drive word lines 118 using word line voltages generated from voltage generator 310. In some implementations, row decoder/word line driver 308 can also select/deselect and drive SSG lines 115 and DSG lines 113 as well. Row decoder/word line driver 308 can be configured to apply a read voltage to selected word line 118 in a read operation on memory cell 106 coupled to selected word line 118.

Voltage generator 310 can be configured to be controlled by control logic 312 and generate the word line voltages (e.g., read voltage, program voltage, pass voltage, local voltage, verification voltage, etc.), bit line voltages, and source line voltages to be supplied to memory cell array 101.

Control logic 312 can be coupled to each peripheral circuit described above and configured to control operations of each peripheral circuit. Registers 314 can be coupled to control logic 312 and include status registers, command registers, and address registers for storing status information, command operation codes (OP codes), and command addresses for controlling the operations of each peripheral circuit. The status registers of registers 314 can include one or more registers configured to store open block information indicative of the open block(s) of all blocks 104 in memory cell array 101, such as having an auto dynamic start voltage (ADSV) list. In some implementations, the open block information is also indicative of the last programmed page of each open block.

Interface 316 can be coupled to control logic 312 and act as a control buffer to buffer and relay control commands received from a host (not shown) to control logic 312 and status information received from control logic 312 to the host. Interface 316 can also be coupled to column decoder/bit line driver 306 via a data bus and act as a data input/output (I/O) interface and a data buffer to buffer and relay the data to and from memory cell array 101.

Figure 4A:
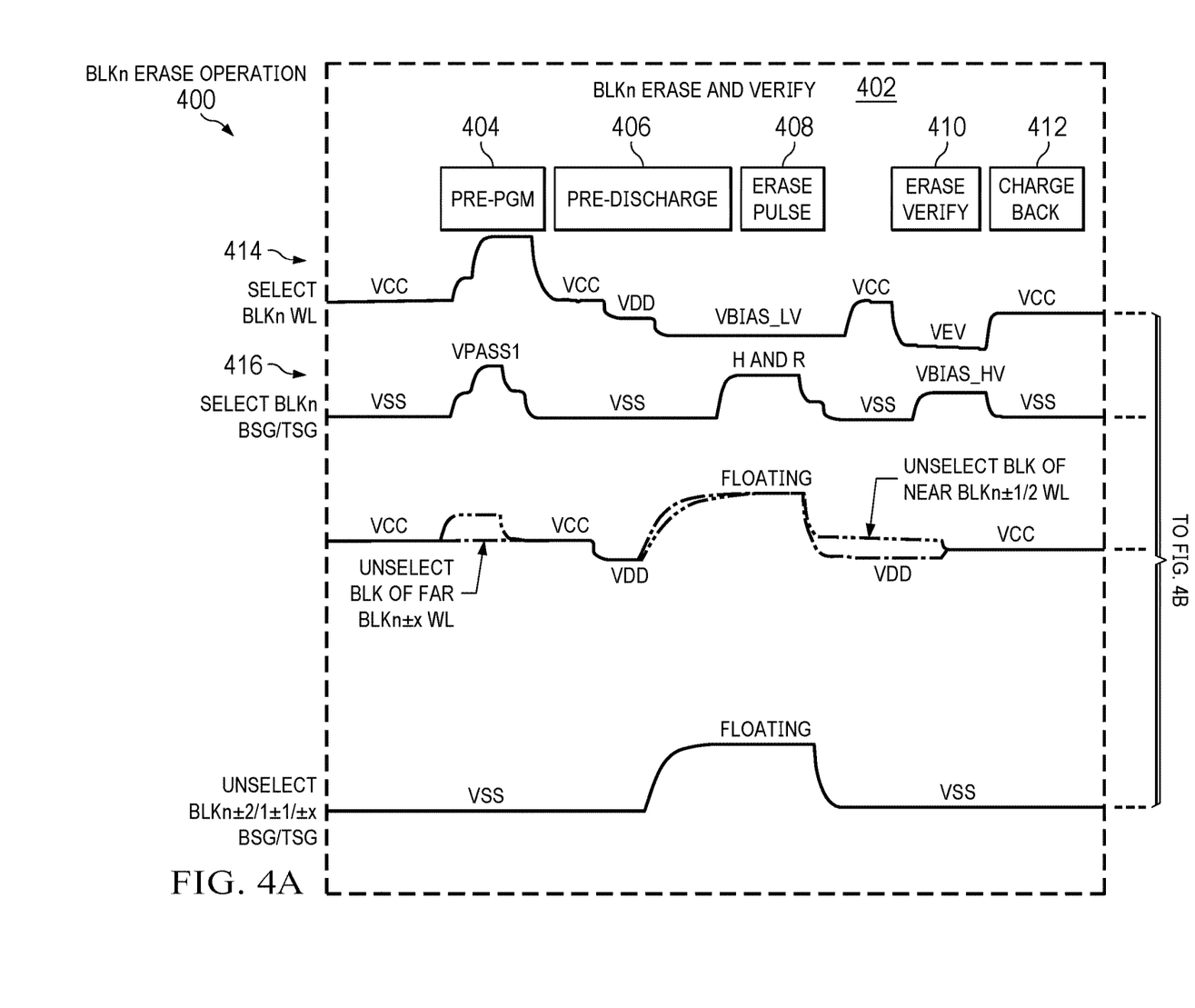
FIGS. 4A and 4B illustrate example voltages of components in a memory cell array during an erase operation of a memory cell block in the memory cell array, according to some aspects of the present disclosure.
Figure 4B:
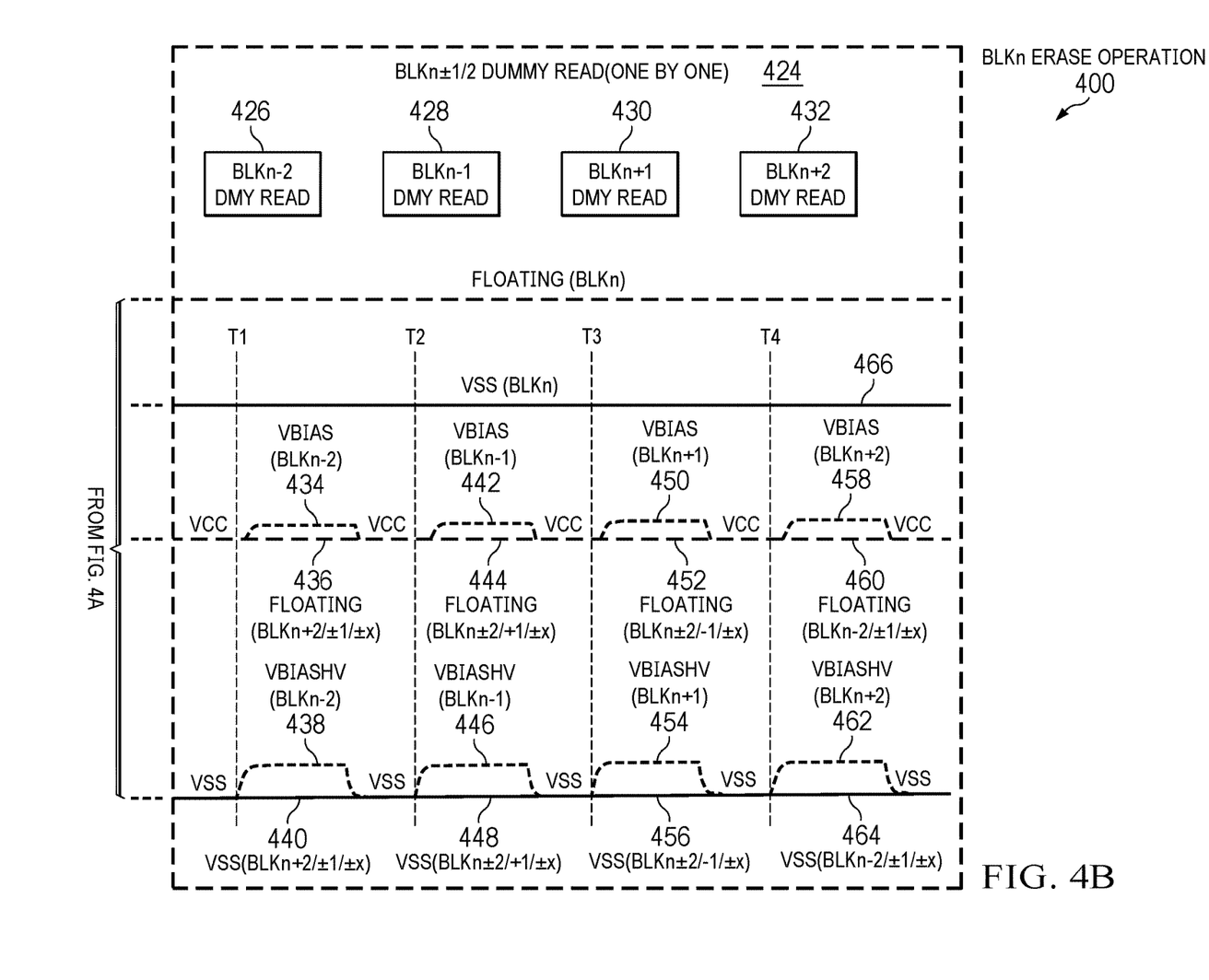

FIGS. 4A and 4B illustrate example voltages of components in a memory cell array during an erase operation 400 of a memory cell block in the memory cell array, according to some aspects of the present disclosure. As shown in FIGS. 4A and 4B, erase operation 400 is performed on memory cell block BLKn (e.g., target block). Memory cell blocks BLKn−1 (e.g., first block) and BLKn+1 (e.g., second block) are the two blocks adjacent to BLKn and on the opposite sides of BLKn. Memory block BLKn−2 (e.g., third block) is adjacent to BLKn−1, and memory block BLKn+2 (e.g., fourth block) is adjacent to BLKn+1. BLKn−2, BLKn−1, BLKn, BLKn+1, and BLKn+2 can each be an example of block 104 in FIG. 1.

As shown in FIGS. 4A and 4B, erase operation 400 of BLKn can include two phases, i.e., BLKn erase and verify phase 402 followed by dummy read phase 424. In some implementations, BLKn erase and verify phase 402 can be performed to erase BLKn. Dummy read phase 424 can then be performed to discharge channel hole potentials of blocks near BLKn that are accumulated during BLKn erase and verify phase 402, and consequently mitigate the issue of soft erase of blocks near BLKn, for example, BLKn−2, BLKn−1, BLKn+1, and/or BLKn+2.

As shown in FIG. 4B, dummy read phase 424 can include read operations 426, 428, 430, and 432 that are sequentially performed on BLKn−2, BLKn−1, BLKn+1, and BLKn+2, respectively. In some implementations, the order of the four read operations 426, 428, 430, and 432 in dummy read phase 424 can be rearranged. In some implementations, read operations within dummy read phase 424 can be performed on more than four memory cell blocks that are close to BLKn. In some implementations, read operations within dummy read phase 424 can be performed on a subset of the four memory cell blocks BLKn−1, BLKn+1, BLKn−2, and BLKn+2.

As shown in FIG. 4A, BLKn erase and verify phase 402 can include pre-programming phase 404, pre-discharge phase 406, erase pulse phase 408, erase verify phase 410, and charge back phase 412. In some implementations, during charge back phase 412, a voltage (e.g., sixth voltage), for example, Vcc, can be applied to one or more word lines coupled to memory cells in the memory cell array, and a voltage (e.g., fifth voltage), for example, Vss, can be applied to one or more select gate lines coupled to select gate transistors in the memory cell to turn off these select gate lines. In some cases, Vss can be lower than Vcc. An example value of Vcc is 2.5V. An example value of Vss is 0V.

In some implementations, during dummy read phase 424, the voltage of word line 414 coupled to memory cells in BLKn can be floating. In some cases, word line 414 can be an example of word line 118 in FIG. 1.

In some implementations, during dummy read phase 424, voltage 466 (e.g., first voltage), for example, Vss, can be applied to select gate line 416 (e.g., first select gate line) coupled to one or more select gate transistors (e.g., first select gate transistor) of BLKn to turn off the one or more select gate transistors of BLKn. In some cases, select gate line 416 can be a top select gate (TSG) line, for example, DSG line 113 in FIG. 1. In some cases, select gate line 416 can be a bottom select gate (BSG) line, for example, SSG line 115 in FIG. 1.

In some implementations, after BLKn erase and verify phase 402 is performed, read operation 426 of BLKn−2 can be performed first within dummy read phase 424. For example, at time t1, voltage 438 (e.g., second voltage), for example, Vbiashv, can be applied to a select gate line (e.g., second select gate line) coupled to one or more select gate transistors (e.g., second select gate transistor) of BLKn−2 to turn on the one or more select gate transistors of BLKn−2, such that the channel hole potential of BLKn−2 can be reduced. In some cases, the select gate line can be a top select gate (TSG) line, for example, DSG line 113 in FIG. 1. In some cases, the select gate line can be a bottom select gate (BSG) line, for example, SSG line 115 in FIG. 1. An example range of voltage 438 can be between 2.2V and 3.5V.

In some implementations, during read operation 426, voltage 440 (e.g., fourth voltage), for example, Vss, can be applied to a select gate line coupled to one or more select gate transistors of a memory cell block (e.g., second block) other than BLKn−2 to turn off the one or more select gate transistors of that block.

In some implementations, during read operation 426 and at or after time t1, voltage 434, for example, Vbias, can be applied to a word line coupled to memory cells of BLKn−2 to save the time to set up the word line. In some cases, the word line can be an example of word line 118 in FIG. 1. An example range of voltage 434 can be between 1.8V and 3.8V.

In some implementations, during read operation 426, voltage 436 of a word line coupled to memory cells in a block other than BLKn−2 can be floating.

In some implementations, after read operation 426 is performed, read operation 428 of BLKn−1 can be performed next within dummy read phase 424. For example, at time t2, voltage 446, for example, Vbiashv, can be applied to a select gate line coupled to one or more select gate transistors of BLKn−1 to turn on the one or more select gate transistors of BLKn−1, such that the channel hole potential of BLKn−1 can be reduced. In some cases, the select gate line can be a top select gate (TSG) line, for example, DSG line 113 in FIG. 1. In some cases, the select gate line can be a bottom select gate (BSG) line, for example, SSG line 115 in FIG. 1. An example range of voltage 446 can be between 2.2V and 3.5V.

In some implementations, during read operation 428, voltage 448, for example, Vss, can be applied to a select gate line coupled to one or more select gate transistors of a memory cell block other than BLKn−1 to turn off the one or more select gate transistors of that block.

In some implementations, during read operation 428 and at or after time t2, voltage 442 (e.g., third voltage), for example, Vbias, can be applied to a word line coupled to memory cells of BLKn−1 to save the time to set up the word line. In some cases, the word line can be an example of word line 118 in FIG. 1. An example range of voltage 442 can be between 1.8V and 3.8V.

In some implementations, during read operation 428, voltage 444 of a word line coupled to memory cells in a block other than BLKn−1 can be floating.

In some implementations, after read operation 428 is performed, read operation 430 of BLKn+1 can be performed next within dummy read phase 424. For example, at time t3, voltage 454, for example, Vbiashv, can be applied to a select gate line coupled to one or more select gate transistors of BLKn+1 to turn on the one or more select gate transistors of BLKn+1, such that the channel hole potential of BLKn+1 can be reduced. In some cases, the select gate line can be a top select gate (TSG) line, for example, DSG line 113 in FIG. 1. In some cases, the select gate line can be a bottom select gate (BSG) line, for example, SSG line 115 in FIG. 1. An example range of voltage 454 can be between 2.2V and 3.5V.

In some implementations, during read operation 430, voltage 456, for example, Vss, can be applied to a select gate line coupled to one or more select gate transistors of a memory cell block other than BLKn+1 to turn off the one or more select gate transistors of that block.

In some implementations, during read operation 430 and at or after time t3, voltage 450, for example, Vbias, can be applied to a word line coupled to memory cells of BLKn+1 to save the time to set up the word line. In some cases, the word line can be an example of word line 118 in FIG. 1. An example range of voltage 450 can be between 1.8V and 3.8V.

In some implementations, during read operation 430, voltage 452 of a word line coupled to memory cells in a block other than BLKn+1 can be floating.

In some implementations, after read operation 430 is performed, read operation 432 of BLKn+2 can be performed next within dummy read phase 424. For example, at time t4, voltage 462, for example, Vbiashv, can be applied to a select gate line coupled to one or more select gate transistors of BLKn+2 to turn on the one or more select gate transistors of BLKn+2, such that the channel hole potential of BLKn+2 can be reduced. In some cases, the select gate line can be a top select gate (TSG) line, for example, DSG line 113 in FIG. 1. In some cases, the select gate line can be a bottom select gate (BSG) line, for example, SSG line 115 in FIG. 1. An example range of voltage 462 can be between 2.2V and 3.5V.

In some implementations, during read operation 432, voltage 464, for example, Vss, can be applied to a select gate line coupled to one or more select gate transistors of a memory cell block other than BLKn+2 to turn off the one or more select gate transistors of that block.

In some implementations, during read operation 432 and at or after time t4, voltage 458, for example, Vbias, can be applied to a word line coupled to memory cells of BLKn+2 to save the time to set up the word line. In some cases, the word line can be an example of word line 118 in FIG. 1. An example range of voltage 458 can be between 1.8V and 3.8V.

In some implementations, during read operation 432, voltage 460 of a word line coupled to memory cells in a block other than BLKn+2 can be floating.

Figure 5:
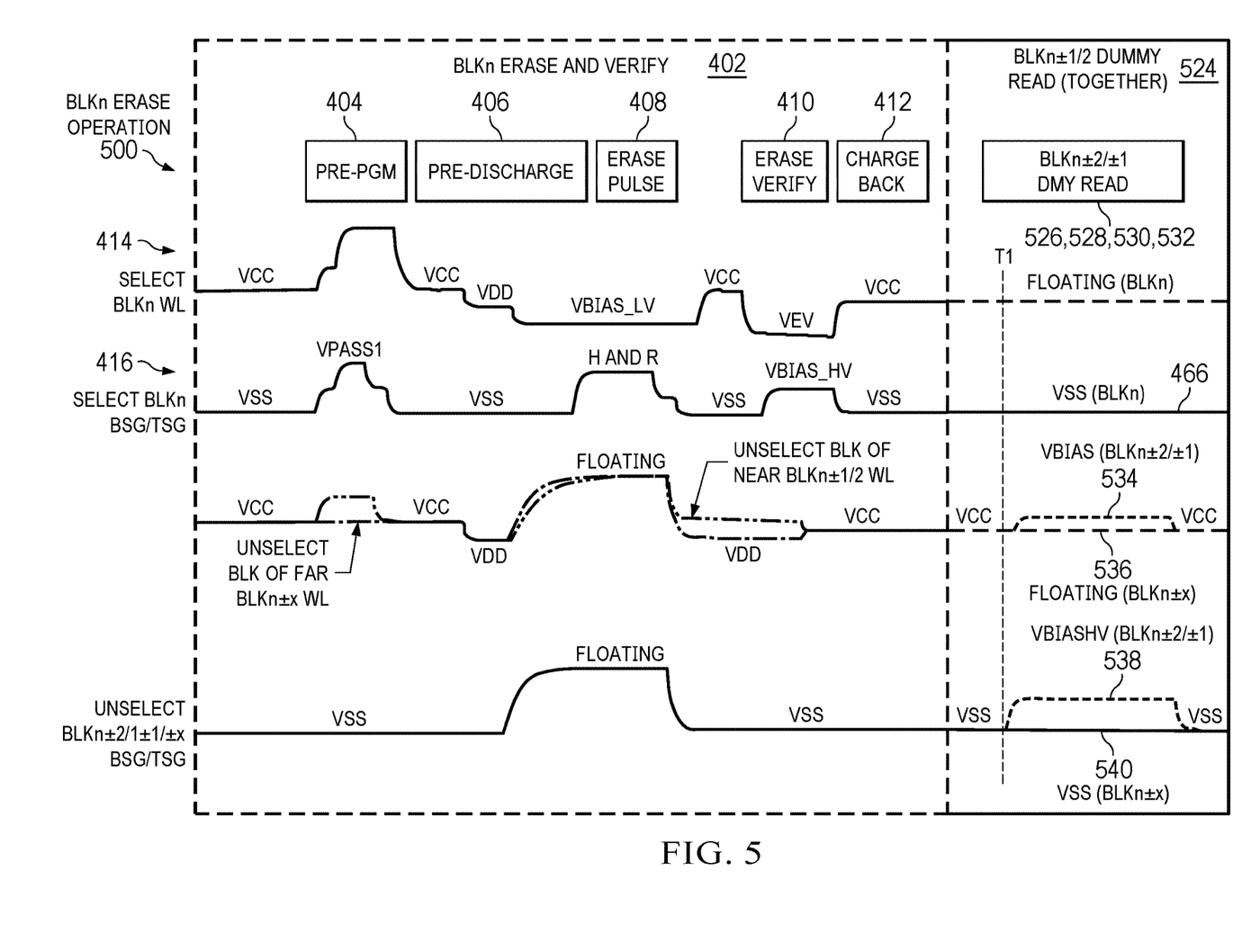
FIG. 5 illustrates another example of voltages of components in a memory cell array during an erase operation of a memory cell block in the memory cell array, according to some aspects of the present disclosure.

FIG. 5 illustrates an example of voltages of components in a memory cell array during an erase operation 500 of a memory cell block in the memory cell array, according to some aspects of the present disclosure. Similar to erase operation 400, erase operation 500 is also performed on memory cell block BLKn (e.g., target block). The difference between erase operation 500 in FIG. 5 and erase operation 400 in FIGS. 4A and 4B is the read operations performed after BLKn erase and verify phase 402. Unlike erase operation 400, where read operations 426, 428, 430, and 432 are sequentially performed on BLKn−2, BLKn−1, BLKn+1, and BLKn+2, respectively, in erase operation 500, read operations 526, 528, 530, and 532 are simultaneously performed on BLKn−2, BLKn−1, BLKn+1, and BLKn+2, respectively, during dummy read phase 524.

In some implementations, during dummy read phase 524, the voltage of word line 414 coupled to memory cells in BLKn can be floating.

In some implementations, during dummy read phase 524, voltage 466, e.g., Vss, can be applied to select gate line 416 coupled to one or more select gate transistors of BLKn to turn off the one or more select gate transistors of BLKn.

As shown in FIG. 5, dummy read phase 524 can include read operations 526, 528, 530, and 532 that are simultaneously performed on BLKn−2, BLKn−1, BLKn+1, and BLKn+2, respectively. In some implementations, read operations within dummy read phase 524 can be performed on more than four memory cell blocks that are close to BLKn. In some implementations, read operations within dummy read phase 524 can be performed on a subset of the four memory cell blocks BLKn−1, BLKn+1, BLKn−2, and BLKn+2.

In some implementations, after BLKn erase and verify phase 402 is performed, read operations 526, 528, 530, and 532 can be simultaneously performed on BLKn−2, BLKn−1, BLKn+1, and BLKn+2, respectively, within dummy read phase 524. For example, at time t1, voltage 538, for example, Vbiashv, can be applied to a respective select gate line coupled to one or more select gate transistors of each of BLKn−2, BLKn−1, BLKn+1, and BLKn+2, to turn on the one or more select gate transistors, such that the respective channel hole potential of each of BLKn−2, BLKn−1, BLKn+1, and BLKn+2 can be reduced.

In some implementations, during dummy read phase 524, voltage 540, for example, Vss, can be applied to a select gate line coupled to one or more select gate transistors of a memory cell block other than BLKn−2, BLKn−1, BLKn, BLKn+1, and BLKn+2, in order to turn off the one or more select gate transistors of that block.

In some implementations, during dummy read phase 524 and at or after time t1, voltage 534, for example, Vbias, can be applied to a respective word line coupled to memory cells of BLKn−2, BLKn−1, BLKn+1, and BLKn+2 to save the time to set up the respective word line.

In some implementations, during dummy read phase 524, voltage 536 of a word line coupled to memory cells in a block other than BLKn−2, BLKn−1, BLKn, BLKn+1, and BLKn+2 can be floating.

Figure 6:
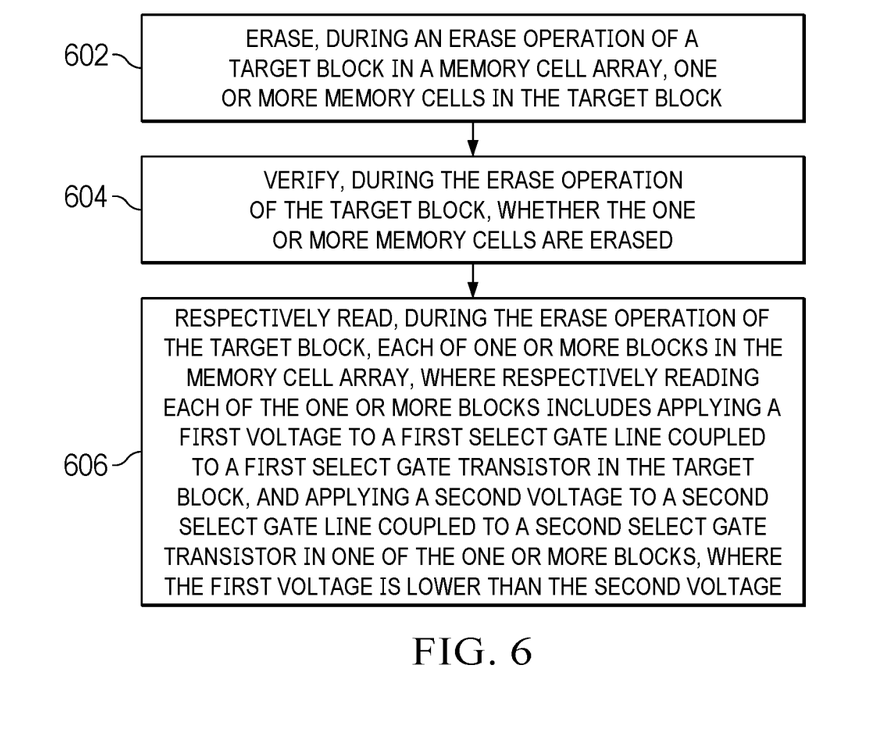
FIG. 6 illustrates an example of a flow chart of a method for reducing erase disturb in a memory device, according to some aspects of the present disclosure.

FIG. 6 illustrates an example 600 of a flow chart of a method for reducing erase disturb in a memory device, according to some aspects of the present disclosure. At 602, a peripheral circuit of the memory device erases, during an erase operation of a target block in a memory cell array, one or more memory cells in the target block.

At 604, the peripheral circuit verifies, during the erase operation of the target block, whether the one or more memory cells are erased.

At 606, the peripheral circuit respectively reads, during the erase operation of the target block, each of one or more blocks in the memory cell array, where respectively reading each of the one or more blocks includes applying a first voltage to a first select gate line coupled to a first select gate transistor in the target block, and applying a second voltage to a second select gate line coupled to a second select gate transistor in one of the one or more blocks, where the first voltage is lower than the second voltage.

Figure 7:
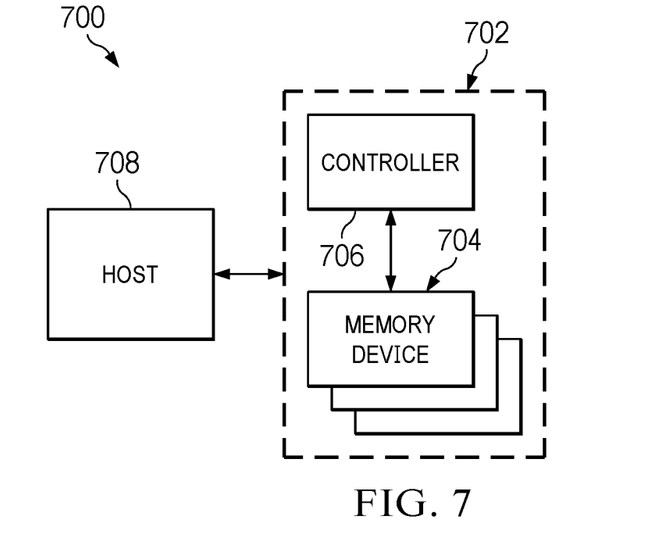
FIG. 7 illustrates a block diagram of an example system having a memory device, according to some aspects of the present disclosure.

FIG. 7 illustrates a block diagram of an example system 700 having a memory device, according to some aspects of the present disclosure. System 700 can be a mobile phone, a desktop computer, a laptop computer, a tablet, a vehicle computer, a gaming console, a printer, a positioning device, a wearable electronic device, a smart sensor, a virtual reality (VR) device, an argument reality (AR) device, or any other suitable electronic devices having storage therein. As shown in FIG. 7, system 700 can include a host 708 and a memory system 702 having one or more memory devices 704 and a memory controller 706. Host 708 can be a processor of an electronic device, such as a central processing unit (CPU), or a system-on-chip (SoC), such as an application processor (AP). Host 708 can be configured to send or receive data to or from memory devices 704.

Memory device 704 can be any memory device disclosed in the present disclosure. Memory controller 706 is coupled to memory device 704 and host 708 and is configured to control memory device 704, according to some implementations. Memory controller 706 can manage the data stored in memory device 704 and communicate with host 708. In some implementations, memory controller 706 is designed for operating in a low duty-cycle environment like secure digital (SD) cards, compact Flash (CF) cards, universal serial bus (USB) Flash drives, or other media for use in electronic devices, such as personal computers, digital cameras, mobile phones, etc. In some implementations, memory controller 706 is designed for operating in a high duty-cycle environment SSDs or embedded multi-media-cards (eMMCs) used as data storage for mobile devices, such as smartphones, tablets, laptop computers, etc., and enterprise storage arrays. Memory controller 706 can be configured to control operations of memory device 704, such as read, erase, and program operations. Memory controller 706 can also be configured to manage various functions with respect to the data stored or to be stored in memory device 704 including, but not limited to bad-block management, garbage collection, logical-to-physical address conversion, wear leveling, etc. In some implementations, memory controller 706 is further configured to process error correction codes (ECCs) with respect to the data read from or written to memory device 704. Any other suitable functions may be performed by memory controller 706 as well, for example, formatting memory device 704.

Memory controller 706 can communicate with an external device (e.g., host 708) according to a particular communication protocol. For example, memory controller 706 may communicate with the external device through at least one of various interface protocols, such as a USB protocol, an MMC protocol, a peripheral component interconnection (PCI) protocol, a PCI-express (PCI-E) protocol, an advanced technology attachment (ATA) protocol, a serial-ATA protocol, a parallel-ATA protocol, a small computer small interface (SCSI) protocol, an enhanced small disk interface (ESDI) protocol, an integrated drive electronics (IDE) protocol, a Firewire protocol, etc.

Figure 8A:
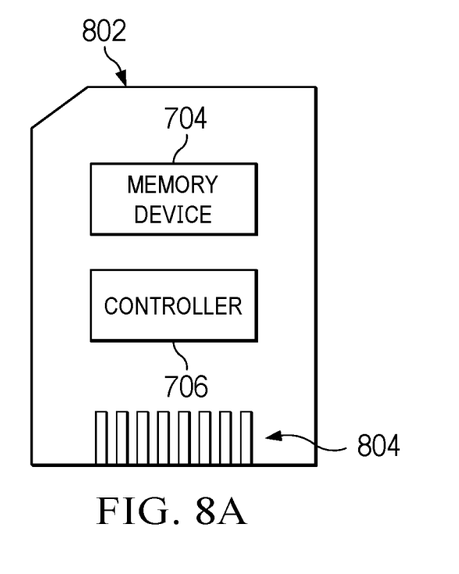
FIG. 8A illustrates a diagram of a memory card having a memory device, according to some aspects of the present disclosure.
Figure 8B:
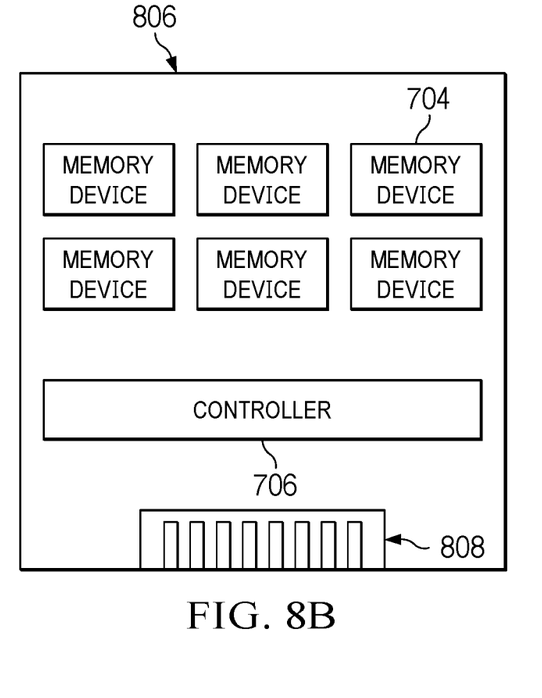
FIG. 8B illustrates a diagram of a solid-state drive (SSD) having a memory device, according to some aspects of the present disclosure.

Memory controller 706 and one or more memory devices 704 can be integrated into various types of storage devices, for example, be included in the same package, such as a universal Flash storage (UFS) package or an eMMC package. That is, memory system 702 can be implemented and packaged into different types of end electronic products. In one example shown in FIG. 8A, memory controller 706 and a single memory device 704 may be integrated into a memory card 802. Memory card 802 can include a PC card (PCMCIA, personal computer memory card international association), a CF card, a smart media (SM) card, a memory stick, a multimedia card (MMC, RS-MMC, MMCmicro), an SD card (SD, miniSD, microSD, SDHC), a UFS, etc. Memory card 802 can further include a memory card connector 804 coupling memory card 802 with a host (e.g., host 708 in FIG. 7). In another example shown in FIG. 8B, memory controller 706 and multiple memory devices 704 may be integrated into an SSD 806. SSD 806 can further include an SSD connector 808 coupling SSD 806 with a host (e.g., host 708 in FIG. 7). In some implementations, the storage capacity and/or the operation speed of SSD 806 is greater than those of memory card 802.

While this specification contains many specific implementation details, these should not be construed as limitations on the scope of what may be claimed, but rather as descriptions of features that may be specific to particular implementations. Certain features that are described in this specification in the context of separate implementations can also be implemented, in combination, in a single implementation. Conversely, various features that are described in the context of a single implementation can also be implemented in multiple implementations, separately, or in any sub-combination. Moreover, although previously described features may be described as acting in certain combinations and even initially claimed as such, one or more features from a claimed combination can, in some cases, be excised from the combination, and the claimed combination may be directed to a sub-combination or variation of a sub-combination.

As used in this disclosure, the terms "a," "an," or "the" are used to include one or more than one unless the context clearly dictates otherwise. The term "or" is used to refer to a nonexclusive "or" unless otherwise indicated. The statement "at least one of A and B" has the same meaning as "A, B, or A and B." In addition, the phraseology or terminology employed in this disclosure, and not otherwise defined, is for the purpose of description only and not of limitation. Any use of section headings is intended to aid reading of the document and is not to be interpreted as limiting; information that is relevant to a section heading may occur within or outside of that particular section.

As used in this disclosure, the term "about" or "approximately" can allow for a degree of variability in a value or range, for example, within 10%, within 5%, or within 1% of a stated value or of a stated limit of a range.

As used in this disclosure, the term "substantially" refers to a majority of, or mostly, as in at least about 50%, 60%, 70%, 80%, 90%, 95%, 96%, 97%, 98%, 99%, 99.5%, 99.9%, 99.99%, or at least about 99.999% or more.

Values expressed in a range format should be interpreted in a flexible manner to include not only the numerical values explicitly recited as the limits of the range, but also to include all the individual numerical values or sub-ranges encompassed within that range as if each numerical value and sub-range is explicitly recited. For example, a range of "0.1% to about 5%" or "0.1% to 5%" should be interpreted to include about 0.1% to about 5%, as well as the individual values (for example, 1%, 2%, 3%, and 4%) and the sub-ranges (for example, 0.1% to 0.5%, 1.1% to 2.2%, 3.3% to 4.4%) within the indicated range. The statement "X to Y" has the same meaning as "about X to about Y," unless indicated otherwise. Likewise, the statement "X, Y, or Z" has the same meaning as "about X, about Y, or about Z," unless indicated otherwise.

Particular implementations of the subject matter have been described. Other implementations, alterations, and permutations of the described implementations are within the scope of the following claims as will be apparent to those skilled in the art. While operations are depicted in the drawings or claims in a particular order, such operations are not required be performed in the particular order shown or in sequential order, or that all illustrated operations be performed (some operations may be considered optional), to achieve desirable results. In certain circumstances, multitasking or parallel processing (or a combination of multitasking and parallel processing) may be advantageous and performed as deemed appropriate.

Moreover, the separation or integration of various system modules and components in the previously described implementations are not required in all implementations, and the described components and systems can generally be integrated together or packaged into multiple products.

Accordingly, the previously described example implementations do not define or constrain the present disclosure. Other changes, substitutions, and alterations are also possible without departing from the spirit and scope of the present disclosure.

What is claimed is:
1. A method, comprising:
erasing, during an erase operation of a target block in a memory cell array, one or more memory cells in the target block;
verifying, during the erase operation of the target block, whether the one or more memory cells are erased; and
respectively reading, during the erase operation of the target block, each of one or more blocks in the memory cell array, wherein respectively reading each of the one or more blocks comprises:

applying a first voltage to a first select gate line coupled to a first select gate transistor in the target block; and applying a second voltage to a second select gate line coupled to a second select gate transistor in one of the one or more blocks, wherein the first voltage is lower than the second voltage.

2. The method according to claim 1, wherein the one or more blocks comprise a first block adjacent to the target block and a second block adjacent to the target block, wherein the first block and the second block are on two opposite sides of the target block.

3. The method according to claim 2, wherein the one or more blocks comprise a third block adjacent to the first block and a fourth block adjacent to the second block.

4. The method according to claim 2, wherein respectively reading each of the one or more blocks comprises:

reading the first block and the second block, comprising:
during a period of applying the first voltage to the first select gate line coupled to the first select gate transistor in the target block:
applying the second voltage to a select gate line coupled to a select gate transistor in the first block; and
applying the second voltage to a select gate line coupled to a select gate transistor in the second block.

5. The method according to claim 2, wherein respectively reading each of the one or more blocks in the memory cell array comprises:

reading the first block, comprising:
applying a third voltage to a word line coupled to at least one memory cell in the first block, wherein the third voltage is higher than a voltage of a word line coupled to at least one memory cell in the second block;
applying a fourth voltage to a select gate line coupled to at least one select gate transistor in the second block; and
applying the second voltage to a select gate line coupled to at least one select gate transistor in the first block, wherein the second voltage is higher than the fourth voltage.

6. The method according to claim 5, wherein respectively reading each of the one or more blocks in the memory cell array further comprises:

after reading the first block, reading the second block, comprising:
applying the third voltage to the word line coupled to at least one memory cell in the second block, wherein the third voltage is higher than a voltage of the word line coupled to at least one memory cell in the first block;
applying the fourth voltage to the select gate line coupled to at least one select gate transistor in the first block; and
applying the second voltage to a select gate line coupled to at least one select gate transistor in the second block.

7. The method according to claim 5, wherein reading the first block further comprises:
applying the fourth voltage to a select gate line coupled to at least one select gate transistor in the target block, wherein the fourth voltage is lower than the third voltage.

8. The method according to claim 5, wherein a range of the third voltage is 1.8V to 3.8V, and a range of the second voltage is 2.2V to 3.5V.

9. The method according to claim 1, wherein the method further comprises:
after erasing the one or more memory cells in the target block and before respectively reading each of the one or more blocks:
applying a fifth voltage to a select gate line coupled to at least one select gate transistor in the memory cell array; and
applying a sixth voltage to a word line coupled to at least one memory cell in the memory cell array, wherein the fifth voltage is lower than the sixth voltage.

10. The method according to claim 1, wherein respectively reading each of the one or more blocks comprises:
after erasing the one or more memory cells in the target block and during the erase operation of the target block, respectively reading each of the one or more blocks.

11. A memory device, comprising:
a memory cell array; and
a peripheral circuit coupled to the memory cell array and configured to perform operations comprising:
erasing, during an erase operation of a target block in the memory cell array, one or more memory cells in the target block;
verifying, during the erase operation of the target block, whether the one or more memory cells are erased; and
respectively reading, during the erase operation of the target block, each of one or more blocks in the memory cell array, wherein respectively reading each of the one or more blocks comprises:
applying a first voltage to a first select gate line coupled to a first select gate transistor in the target block; and
applying a second voltage to a second select gate line coupled to a second select gate transistor in one of the one or more blocks, wherein the first voltage is lower than the second voltage.

12. The memory device according to claim 11, wherein the one or more blocks comprise a first block adjacent to the target block and a second block adjacent to the target block, wherein the first block and the second block are on two opposite sides of the target block.

13. The memory device according to claim 12, wherein the one or more blocks comprise a third block adjacent to the first block and a fourth block adjacent to the second block.

14. The memory device according to claim 12, wherein respectively reading each of the one or more blocks comprises:

reading the first block and the second block, comprising:
during a period of applying the first voltage to the first select gate line coupled to the first select gate transistor in the target block:
applying the second voltage to a select gate line coupled to a select gate transistor in the first block; and
applying the second voltage to a select gate line coupled to a select gate transistor in the second block.

15. The memory device according to claim 12, wherein respectively reading each of the one or more blocks in the memory cell array comprises:

reading the first block, comprising:
applying a third voltage to a word line coupled to at least one memory cell in the first block, wherein the third voltage is higher than a voltage of a word line coupled to at least one memory cell in the second block;

applying a fourth voltage to a select gate line coupled to at least one select gate transistor in the second block; and applying the second voltage to a select gate line coupled to at least one select gate transistor in the first block, wherein the second voltage is higher than the fourth voltage.

16. The memory device according to claim 15, wherein respectively reading each of the one or more blocks in the memory cell array further comprises:

after reading the first block, reading the second block, comprising:

applying the third voltage to the word line coupled to at least one memory cell in the second block, wherein the third voltage is higher than a voltage of the word line coupled to at least one memory cell in the first block;

applying the fourth voltage to the select gate line coupled to at least one select gate transistor in the first block; and applying the second voltage to a select gate line coupled to at least one select gate transistor in the second block.

17. The memory device according to claim 15, wherein reading the first block further comprises:

applying the fourth voltage to a select gate line coupled to at least one select gate transistor in the target block, wherein the fourth voltage is lower than the third voltage, a range of the third voltage is 1.8V to 3.8V, and a range of the second voltage is 2.2V to 3.5V.

18. The memory device according to claim 11, wherein the operations further comprise:

after erasing the one or more memory cells in the target block and before respectively reading each of the one or more blocks:

applying a fifth voltage to a select gate line coupled to at least one select gate transistor in the memory cell array; and applying a sixth voltage to a word line coupled to at least one memory cell in the memory cell array, wherein the fifth voltage is lower than the sixth voltage.

19. The memory device according to claim 11, wherein respectively reading each of the one or more blocks comprises:

after erasing the one or more memory cells in the target block and during the erase operation of the target block, respectively reading each of the one or more blocks.

20. A memory system, comprising:

a memory device, comprising:

a memory cell array; and a peripheral circuit coupled to the memory cell array and configured to perform operations comprising:

erasing, during an erase operation of a target block in the memory cell array, one or more memory cells in the target block;

verifying, during the erase operation of the target block, whether the one or more memory cells are erased; and respectively reading, during the erase operation of the target block, each of one or more blocks in the memory cell array, wherein respectively reading each of the one or more blocks comprises:

applying a first voltage to a first select gate line coupled to a first select gate transistor in the target block; and applying a second voltage to a second select gate line coupled to a second select gate transistor in one of the one or more blocks, wherein the first voltage is lower than the second voltage; and a controller coupled to the memory device and configured to send one or more signals to the memory device to initiate the operations.

\* \* \* \* \*